(12) United States Patent
Hafermalz et al.

(10) Patent No.: US 11,524,714 B2
(45) Date of Patent: Dec. 13, 2022

(54) FLOATING BEARING, STEERING GEAR, AND STEERING SYSTEM

(71) Applicant: Robert Bosch GmbH, Stuttgart (DE)

(72) Inventors: Jens-Uwe Hafermalz, Waeschenbeuren (DE); Marco Grau, Schwäbisch Gmünd (DE); Martin Zimmermann, Schwäbisch Gmünd (DE); Dennis Fuechsel, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 445 days.

(21) Appl. No.: 16/610,672

(22) PCT Filed: May 15, 2018

(86) PCT No.: PCT/EP2018/062446
§ 371 (c)(1),
(2) Date: Nov. 4, 2019

(87) PCT Pub. No.: WO2018/224248
PCT Pub. Date: Dec. 13, 2018

(65) Prior Publication Data
US 2020/0180677 A1    Jun. 11, 2020

(30) Foreign Application Priority Data
Jun. 7, 2017 (DE) ..................... 10 2017 209 563.6

(51) Int. Cl.
*F16H 1/16* (2006.01)
*F16H 55/24* (2006.01)
(Continued)

(52) U.S. Cl.
CPC ............. *B62D 5/0409* (2013.01); *B62D 3/12* (2013.01); *F16C 23/06* (2013.01); *F16H 1/16* (2013.01);
(Continued)

(58) Field of Classification Search
CPC .......... B62D 5/0409; B62D 3/12; B62D 3/02; F16C 23/06; F16C 2326/24; F16H 1/16;
(Continued)

(56) References Cited

U.S. PATENT DOCUMENTS

| 2004/0149512 A1 | 8/2004 | Tsutsui et al. |
| 2004/0163879 A1 | 8/2004 | Segawa |
| 2016/0201760 A1* | 7/2016 | Kwon ..................... F16H 55/24 74/409 |

FOREIGN PATENT DOCUMENTS

| CN | 101868637 A | 10/2010 |
| CN | 102770675 A | 11/2012 |

(Continued)

OTHER PUBLICATIONS

International Search Report corresponding to PCT Application No. PCT/EP2018/062446, dated Jul. 31, 2018 (German and English language document) (7 pages).

*Primary Examiner* — Jake Cook
*Assistant Examiner* — T. Scott Fix
(74) *Attorney, Agent, or Firm* — Maginot, Moore & Beck LLP (57) ABSTRACT

A floating bearing for a steering gear of a motor vehicle includes a rotary bearing having an inner bearing ring for receiving a screw pinion shaft of the steering gear, and an outer bearing ring built into a bearing sleeve. The bearing sleeve interacts with a guiding element, which interacts with a holding element, such that the bearing sleeve moves relative to the holding element in a first direction oriented radially to the longitudinal axis of the bearing sleeve when the screw pinion shaft is not loaded with torque, and relative movement is prevented when the screw pinion shaft is loaded with torque by moving the bearing sleeve in relation to the holding element in a second direction that is oriented radially to the longitudinal axis and perpendicularly to the (Continued)

first direction, whereby the guiding element is tilted in a guiding opening of the holding element or the bearing sleeve.

13 Claims, 5 Drawing Sheets

(51) Int. Cl.
*B62D 5/04* (2006.01)
*B62D 3/12* (2006.01)
*F16C 23/06* (2006.01)
*B62D 3/02* (2006.01)

(52) U.S. Cl.
CPC ............... *F16H 55/24* (2013.01); *B62D 3/02* (2013.01); *F16C 2326/24* (2013.01)

(58) Field of Classification Search
CPC ............... F16H 55/24; F16H 2057/125; F16H 2057/126; F16H 2057/127

USPC ......................................................... 180/444
See application file for complete search history.

(56) References Cited

FOREIGN PATENT DOCUMENTS

| | | | |
|---|---|---|---|
| CN | 105164000 A | 12/2015 | |
| DE | 10123767 A1 * | 11/2001 | ........... B62D 5/0409 |
| DE | 10 2008 040 673 A1 | 1/2010 | |
| DE | 10 2009 054 655 A1 | 6/2011 | |
| EP | 2217818 B1 | 8/2010 | |
| EP | 2 836 416 B1 | 2/2015 | |
| EP | 2 836 417 B1 | 2/2015 | |
| JP | 2002-96749 A | 4/2002 | |
| JP | 2007-290441 A | 11/2007 | |
| JP | 2013-520626 A | 6/2013 | |
| KR | 10-0755909 B1 | 9/2007 | |
| WO | 2016/151305 A1 | 9/2016 | |
| WO | 2018/060701 A1 | 4/2018 | |

* cited by examiner

FLOATING BEARING, STEERING GEAR, AND STEERING SYSTEM

This application is a 35 U.S.C. § 371 National Stage Application of PCT/EP2018/062446, filed on May 15, 2018, which claims the benefit of priority to Serial No. DE 10 2017 209 563.6, filed on Jun. 7, 2017 in Germany, the disclosures of which are incorporated herein by reference in their entirety.

The disclosure relates to a floating bearing for a steering gear. The disclosure further relates to a steering gear having such a floating bearing and a steering system having such a steering gear, in particular a power-assisted steering system.

BACKGROUND

There are fitted in most motor vehicles power-assisted steering systems which produce a supporting torque during steering and which thereby reduce the steering torque which has to be applied by the driver to the steering column.

The known power-assisted steering systems are based on a steering gear which translates the drive power of a hydraulic or electrical steering motor and transmits it, for example, to the steering column. Such steering gears are regularly constructed in the form of a screw rolling gear and in particular as a helical gear mechanism or worm gear. They comprise a gear wheel which is connected directly or indirectly to the steering column and a pinion gear which meshes therewith and which is driven by means of a shaft by the steering motor.

Gear backlash, which is formed as a result of component tolerances, different thermal expansions of the gear elements, as a result of wear and/or as a result of the material settling in toothed wheels produced from plastics material, has been found to be problematic in such steering gears. Particularly in the case of so-called right/left steering, that is to say, in the event of steering actions which follow directly one after the other with a changing steering lock direction, such gear backlash produces undesirable noise which results from the alternating application of opposite flanks of the teeth of the pinion gear and gear wheel.

It is known to eliminate this gear backlash in that the pinion shaft is supported in a pivotable manner about an axis which extends perpendicularly to the longitudinal axis of the pinion shaft and with a spacing from the tooth arrangement engagement of the pinion gear and gear wheel and is pressed against the gear wheel by means of one or more resilient elements. In this case, the pivotability of the pinion shaft is regularly integrated into one of the two bearings, via which the pinion shaft is supported at the end side. This bearing is referred to as a "fixed bearing". The bearing in the region of the other end is then configured with a defined movability (so-called "floating bearing") in order to allow the redirection caused by the pivot movement. The fixed bearing may be provided in particular at the drive side while the floating bearing is provided on the free end of the pinion shaft. In this case, the resilient element(s) for pressing the pinion against the gear wheel can be integrated both in the floating bearing and in the fixed bearing.

Such a steering gear in which the resilient force for the resilient loading is produced by means of the fixed bearing is known, for example, from DE 10 2009 054 655 A1. In this steering gear, there is provision for the roller bearing which receives the pinion shaft in the region of the fixed bearing to be supported in a pivot sleeve at the outer side. The pivot sleeve comprises a bearing sleeve which receives the roller bearing in a substantially play-free manner and an outer ring which is retained in a substantially play-free manner in a receiving member of a housing of the steering gear, wherein the outer ring and the bearing sleeve are connected via a plurality of torsion webs which are twisted in the case of rotation of the outer ring relative to the bearing sleeve. After the assembly of the steering gear, the torsion webs are twisted so that the resilient restoring action which is thereby produced brings about the resilient loading of the pinion shaft.

Embodiments of steering gears which are similar to that of DE 10 2009 054 655 A1 are known from DE 10 2008 040 673 A1, EP 2 836 416 B1 and EP 2 836 417 B1.

The pivotability of the pinion shaft about the pivot axis which is defined by the fixed bearing has to be given in a defined minimum dimension, the so-called basic play, in order to allow the pinion shaft to be redirected as a result of temperature-related expansions, as a result of geometry changes of elements of the steering gear produced from plastics materials, in particular the gear wheel and/or the pinion shaft, as a result of water absorption and as a result of roundness deviations of the gear wheel and/or the pinion shaft. At the same time, the basic play must be limited because, if a drive power is transmitted from a steering motor to the gear wheel by means of the pinion shaft, the resiliently loaded pinion shaft is pivoted as a result of the tooth arrangement forces in the direction of an increasing distance away from the gear wheel until an end stop for this pivot movement which can be formed in particular by the floating bearing of the steering gear is reached.

The basic play which has dimensions in the context of the structural configuration of such a steering gear increases in the course of use as a result of wear and as a result of settling (that is to say, a plastic deformation as a result of permanent loading) of the elements of the steering gear, in particular in the configuration thereof from plastics material(s). Shape and position tolerances caused by production can also lead to an increase of the basic play. This results in the resilient loading in the new state of the steering gear having to be selected to be so large that undesirably high friction occurs in the tooth arrangement in the event of dimensioning of the resilient loading for the pinion shaft which also takes into consideration a basic play which is given provisionally at the end of an intended period of use of the steering gear, wherein a sufficiently great resilient loading is also intended to be provided at that time.

Therefore, it would be advantageous to have a basic play which remains uniform to the greatest possible extent over the intended period of use and which is further dimensioned to be only so large that the influences which may be anticipated on the gear play, particularly as a result of temperature-related expansions, water absorption and/or production tolerances, can be compensated for without leading to undesirably high friction levels in the tooth arrangement.

SUMMARY

An object of the disclosure is to provide a steering gear in which such basic play which remains uniform to the greatest possible extent is produced.

This object is achieved by means of a floating bearing for a steering gear having the features disclosed herein. The disclosure also relates to a steering gear for a steering system of a motor vehicle having such a floating bearing and a steering system having such a steering gear. Advantageous embodiments of the floating bearing according to the disclosure and therefore of the steering gear according to the disclosure and the steering system according to the disclosure are set out in and/or result from the following description.

A floating bearing according to the disclosure for a steering gear comprises a rotary bearing (preferably a roller bearing, particularly preferably a ball bearing) which has an inner bearing ring which is provided to receive a helical pinion shaft of the steering gear and an outer bearing ring which is integrated in a bearing sleeve (that is to say, received therein or formed by the bearing sleeve itself). Furthermore, there is provision for the bearing sleeve to cooperate with a (preferably pin-like) guide element and for the guide element to cooperate with a retention element which is provided for fixed or non-movable, particularly also integral, integration in a housing of the steering gear in such a manner that the bearing sleeve can be displaced relative to the retention element in a first direction which is orientated radially with respect to the longitudinal axis of the bearing sleeve when the helical pinion shaft is not loaded, that is to say, is not loaded with a torque, while such a relative movement is prevented if the helical pinion shaft is loaded with a torque by the bearing sleeve being moved relative to the retention element in a second direction which is orientated radially with respect to the longitudinal axis of the bearing sleeve and perpendicularly to the first direction, whereby the guide element tilts in a guide opening of the retention element or the bearing sleeve (or an element which is connected to the bearing sleeve).

The term "longitudinal axis" is intended to be understood according to the disclosure to be the axis of a body or a hollow space which extends along the greatest longitudinal extent of the body/hollow space and which connects the geometric center points of the different cross-sections of the body/hollow space.

A steering gear according to the disclosure which is provided for a steering system of a motor vehicle comprises at least one gear wheel, a helical pinion which meshes therewith (in particular a screw pinion) and a helical pinion shaft which comprises the helical pinion, wherein the helical pinion shaft is supported at one side of the helical pinion in a floating bearing according to the disclosure and wherein the retention element of the floating bearing is integrated in a housing of the steering gear in a fixed manner. The fixed integration of the functional element in the housing of the steering gear can preferably be carried out in that the retention element is formed by the housing itself or is connected directly to the housing (for example, screwed or connected in another manner in a non-positive-locking and/or positive-locking and/or materially engaging manner).

Furthermore, there may be provision for a steering gear according to the disclosure for the helical pinion shaft to be supported at the other side of the helical pinion in a fixed bearing which forms a pivot axis about which the helical pinion shaft can be pivoted, wherein the longitudinal axis of the guide element of the floating bearing is orientated transversely and in particular perpendicularly to this pivot axis. Such a fixed bearing may comprise a rotary bearing (preferably a roller bearing, particularly preferably a ball bearing) which has an inner bearing ring which is provided to receive the helical pinion shaft of the steering gear and an outer bearing ring which is received in a bearing sleeve. Furthermore, there may be provided a pivot ring which has an outer ring and an inner ring which are pivotably connected via one or more torsion webs, wherein the inner ring is connected to the bearing sleeve (which is intended to include an integral and in particular one-piece configuration) and the outer ring is provided to support the fixed bearing in a housing of the steering gear.

A steering system according to the disclosure comprises at least one steering gear according to the disclosure and a steering motor which is connected to the helical pinion shaft in a rotationally driving manner. The gear wheel of the steering gear can further be connected to a steering shaft, in particular a steering column, of the steering system in a rotationally secure or rotationally driving manner. The steering system according to the disclosure may in particular be constructed as a power-assisted steering system, by which a supporting torque can be produced by means of the steering motor so that a torque which is intended to be applied to the steering column by a driver of a motor vehicle which comprises the power-assisted steering system for steering the motor vehicle (where applicable, also temporarily as far as zero) is reduced. Alternatively, it is also possible to configure the steering system in such a manner that the entire torque required for steering is (always) produced by the steering motor.

The functional principle of a floating bearing according to the disclosure is based on the fact that, as a result of the configuration of the pinion gear as a helical pinion, during the transmission of a drive power which is transmitted from a steering motor to the helical pinion shaft and from the helical pinion shaft to the gear wheel, the helical pinion shaft is pivoted as a result of the tooth arrangement forces not only about the actual pivot axis of the fixed bearing but also (slightly) also about a second axis which is located perpendicularly to this pivot axis, which may be attributed to play or resilient deformability in the bearing (in particular in the fixed bearing) of the helical pinion shaft. This is utilized by means of the configuration of a floating bearing according to the disclosure in order to bring about the tilting of the guide element in the guide opening after a defined though also relatively small (preferably minimal to the greatest possible extent) redirection (pivot path) of the helical pinion shaft about this second axis, whereby then a pivoting of the helical pinion shaft about the actual pivot axis is also limited or prevented. Accordingly, a stop which acts in a clamping manner for the pivot movement of the helical pinion shaft about the (actual) pivot axis is provided by the cooperation of the guide element and the guide opening and is active, irrespective of the actual wear state of the steering gear and in particular of the gear wheel and the helical pinion, which it/they has/have in accordance with the wear duration, always after substantially the same pivot movement about the second axis which is located perpendicularly relative to the actual pivot axis, wherein the magnitude of this pivot movement about the second axis is substantially uniform over the period of use of the steering gear. As a result of the resilient loading of the helical pinion shaft, it can practically be made possible for the stop which acts in a clamping manner to become active before the forces which are produced by the loading of the helical pinion shaft and which act counter to the resilient loading to over-compensate for the resilient loading so that a floating bearing according to the disclosure prevents pivoting of the helical pinion shaft about the pivot axis which is defined by the fixed bearing substantially directly and therefore completely (in the case and as a result of the loading of the helical pinion shaft with a torque).

The guide opening may be constructed both as a guide channel which is open at one side (that is to say, as a guide groove) and as a guide opening which is closed completely in the peripheral direction.

According to an embodiment of the floating bearing according to the disclosure which is particularly advantageous in structural terms, there may preferably be provision, in order to obtain the functionality according to the disclosure, for the bearing sleeve to be connected to the guide element (preferably directly) (at least so that a relative movement in the direction of the longitudinal axis of the guide element and a tilting about an axis which is parallel with the longitudinal axis of the bearing sleeve is prevented; preferably, a completely non-movable connection is provided) and a portion of the guide element with spacing from the longitudinal axis of the bearing sleeve to be guided in an axially movable manner in a guide opening of the retention element which extends in a radial direction with respect to the longitudinal axis of the bearing sleeve, or the guide element to be connected to the retention element and at least one portion of the guide element with spacing from the longitudinal axis of the bearing sleeve to be guided in an axially movable manner in at least one guide opening of the bearing sleeve (or an element which is connected to the bearing sleeve) which extends in a radial direction with respect to the longitudinal axis of the bearing sleeve. In this case, the guide element can, on the one hand, be connected in a non-movable manner to the retention element, wherein then as also in the configuration according to the first alternative the tilting of the guide element in the guide opening is produced in that the guide element is connected to or cooperates with the retention element in a decentralized manner with respect to the longitudinal axis of the bearing sleeve. The pivoting action which is produced as a result of a loading of the helical pinion shaft with a torque about the mentioned second axis thereby leads to a slight rotation of the bearing sleeve about the longitudinal axis thereof so that an oblique position of the bearing pin inside the guide opening is then produced. The guide element can, on the other hand, also be pivotably connected to the retention element (at least about an axis which preferably extends parallel with the longitudinal axis of the bearing sleeve), wherein the bearing sleeve is then further intended to prevent rotation about the longitudinal axis thereof in order to ensure tilting of the bearing pin inside the guide opening in the event of loading of the helical pinion shaft with a torque. Such securing of the bearing sleeve counter to rotation about the longitudinal axis thereof can preferably be achieved in a steering gear according to the disclosure in that it is constructed at least so as to be rotationally secure and in particular integral with the bearing sleeve for the fixed bearing of the steering gear. The pivotable connection between the guide element and the retention element can be based both on a rotary articulation and on a resilient deformation (for example, of the guide element).

According to a preferred embodiment of a floating bearing according to the disclosure, there may be provision for the longitudinal axis of the guide element to extend radially with respect to the longitudinal axis of the bearing sleeve and for it consequently to intersect therewith. A symmetry with respect to the production of a stop which acts in a clamping manner can thereby be achieved and consequently a (particularly minimal) pivotability of the helical pinion shaft (about the actual pivot axis) which is substantially of the same size for both rotation directions with which the helical pinion shaft is driven by the steering motor.

According to an embodiment of a floating bearing according to the disclosure which is particularly advantageous in structural terms, there may be provision for the guide element to extend in a portion of the bearing sleeve with axial spacing (that is to say, in a direction extending along the longitudinal axis of the bearing sleeve) from the outer bearing ring of the rotary bearing through one or more receiving openings of the bearing sleeve. Such a floating bearing may be advantageously distinguished by a relatively compact structural shape in the direction radial with respect to the longitudinal axis of the bearing sleeve. In an embodiment of such a floating bearing according to the disclosure, in which the guide element is further guided in a movable manner inside a guide opening of the retention element, there may further preferably be provision for the guide element to be arranged to be fixed or to be non-movable (as a result of a positive-locking and/or non-positive-locking and/or materially engaging connection) inside the receiving opening(s) of the bearing sleeve. In an embodiment of such a floating bearing according to the disclosure in which the guide element is movably guided inside at least one guide opening of the bearing sleeve, however, the receiving opening(s) of the bearing sleeve act(s) as a corresponding guide opening(s).

According to an alternative embodiment of a floating bearing according to the disclosure, there may also be provision for the guide element to be connected to the bearing sleeve in a portion of the bearing sleeve which also incorporates the outer bearing ring of the rotary bearing, and the guide element consequently to be arranged radially outside the rotary bearing. Such a floating bearing may advantageously be distinguished by a relatively compact structural shape in the direction of the longitudinal axis of the bearing sleeve.

There may preferably be provision for the guide element to be connected to the bearing sleeve as a separate component in a positive-locking and/or non-positive-locking and/or materially engaging manner, which may have a positive effect on the producibility for such a floating bearing according to the disclosure. However, it is also possible to construct the guide element and the bearing sleeve integrally and in particular in one piece.

There may further be provision for the guide element to have a guide head which is located inside a receiving opening of the retention element and which has at least in one portion a greater cross-sectional surface-area in comparison with a guide element shaft which adjoins the guide element head. In an embodiment of such a floating bearing according to the disclosure, in which the guide element is further guided movably inside a guide opening of the retention element, the relatively large cross-sectional surface-area of the guide element head can then be used in particular to allow tilting of the guide element to a sufficient extent before the clamping action is produced by the tilting of the guide element (head) in the guide opening. In an embodiment of such a floating bearing according to the disclosure, in which the guide element is instead guided movably inside one or more guide openings of the bearing sleeve, the relatively large cross-sectional surface-area of the guide element head can instead be used in particular to construct a pivot bearing, for example, in the form of a ball and socket joint, in cooperation with the receiving opening of the retention element.

The disclosure further also relates to a motor vehicle having a steering system according to the disclosure.

The indefinite articles ("a", "an"), in particular in the patent claims and in the description which generally explains the patent claims, are intended to be understood per se and not as numerical words. Accordingly, specifying components are consequently intended to be understood in such a manner that they are present at least once and may be present several times.

BRIEF DESCRIPTION OF THE DRAWINGS

The disclosure is explained in greater detail below with reference to embodiments which are illustrated in the drawings. In the drawings.

DETAILED DESCRIPTION

Figure 1:
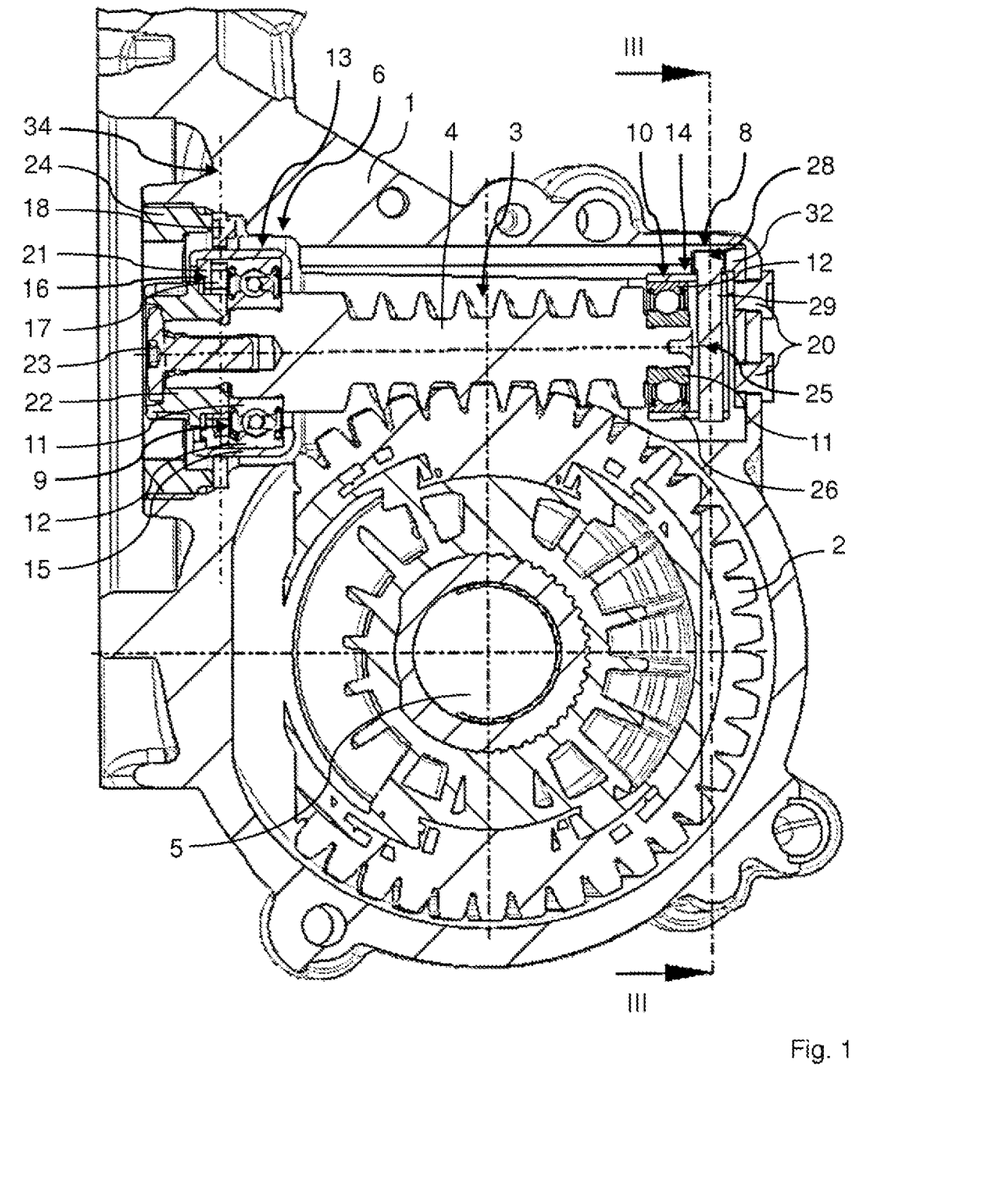
FIG. 1: is a longitudinal section through a steering gear according to the disclosure according to a first embodiment.

FIG. 1 shows the significant components of a steering gear according to the disclosure for a steering system of a motor vehicle according to a first embodiment.

This system comprises a housing 1, inside which a gear wheel 2 and a helical pinion 3 which meshes with the gear wheel 2 are supported. The helical pinion 3 and a helical pinion shaft 4 which comprises the helical pinion 3 are integrally constructed in the form of a screw.

The gear wheel 2 is fixed securely on an output shaft 5 of the steering gear. This output shaft 5 which has in the embodiment shown a tooth arrangement for a rotationally secure connection to the gear wheel 2 can comprise at one end a steering pinion (not shown) which meshes, for example, with a steering rod (not illustrated) which is constructed at least in a portion as a toothed rod, whereby, in the event of a rotation of the output shaft 5, the steering rod carries out a translation movement which can be translated into a pivot movement of articulated wheels (not illustrated) of the motor vehicle in known manner via wheel steering levers (not illustrated). The output shaft 5 may, however, also be a steering column of the power-assisted steering system which is connected in a rotationally secure manner to a steering wheel (not illustrated) and which acts on a steering rod via a steering pinion (not illustrated).

The helical pinion shaft 4 has a drive-side end via which it can be connected to the output shaft of a steering motor which is not illustrated (for example, an electric motor). In the region of this drive-side end, the helical pinion shaft 4 is supported in the housing by means of a first bearing. This bearing is constructed as a fixed bearing 6 which allows pivoting of the helical pinion shaft 4 about a pivot axis 7 (cf. FIG. 2). This pivoting brings about a redirection of the free end of the helical pinion shaft 4 which is supported at that location by means of a floating bearing 8 according to the disclosure, the free end being opposite the drive-side end. This floating bearing 8 is constructed in such a manner that it allows the redirection of this free end of the helical pinion shaft 4 resulting from the pivoting of the helical pinion shaft 4 within limits.

Both the fixed bearing 6 and the floating bearing 8 comprise a rotary bearing 9, 10 in the form of a ball bearing. The corresponding portions of the helical pinion shaft 4 are supported in inner bearing rings 11 of these rotary bearings 9, 10 while outer bearing rings 12 of the rotary bearings 9, 10 are supported in a bearing device 13, 14, respectively, which are in turn received in the housing 1. The bearing devices 13, 14 are structurally constructed in such a manner that they allow the pivoting of the helical pinion shaft 4 about the pivot axis 7 in the case of the fixed bearing 6 and, in the case of the floating bearing 8, allow the pivoting of the free end of the helical pinion shaft 4 in a defined manner.

To this end, the bearing device 13 of the fixed bearing 6 comprises a bearing sleeve 15 which has circular-ring-shaped cross-sections and which receives the rotary bearing 9 at the inner side in a first longitudinal portion and an inner ring 17 of a pivot ring 16 in a second longitudinal portion. The inner ring 17 of the pivot ring 16 is supported inside the bearing sleeve 15 in a rotationally secure and axially secured manner with a support disk 21 being interposed, wherein the inner ring 17 of the pivot ring 16 is supported on the outer bearing ring 12 of the rotary bearing 9. The pivot ring 16 further comprises, in addition to the inner ring 17, an outer ring 18. This outer ring 18 is connected to the inner ring 17 via two torsion webs 19 (cf. FIG. 2). The outer ring 18, the inner ring 17 and the torsion webs 19 are preferably integrally constructed from, for example, spring steel.

An axial positional fixing of the rotary bearing 9 of the fixed bearing 6 on the helical pinion shaft 4 is carried out, with a coupling piece 22 being interposed, by means of a screw 23 which is screwed in an inner thread which is integrated in the corresponding end of the helical pinion shaft 4. The coupling piece 22 also serves to transmit a drive power of the steering motor to the helical pinion shaft 4, to which end they are connected to each other in a rotationally secure manner. This rotationally secure connection is achieved by engagement of an outer tooth arrangement of the helical pinion shaft 4 in a complementary inner tooth arrangement of the coupling piece 22.

An axial positional fixing of the outer ring 18 of the pivot ring 16 inside the housing 1 is brought about by means of a helical ring 24 which has an outer thread which is screwed into a corresponding inner thread of the housing 1.

The two torsion webs 19 define the position of the pivot axis 7, about which the outer ring 18 can be pivoted relative to the inner ring 17 in order to obtain a resilient loading of the helical pinion shaft 4. In this case, however, the torsion webs 19 and therefore the pivot axis 7 do not extend through the center of the pivot ring 16 and therefore the cross-section of the helical pinion shaft 4 but instead in a manner radially offset relative thereto (cf. FIG. 2). The pivot axis 7 consequently does not intersect with the longitudinal axis 25 of the helical pinion shaft 4. As a result of the radial offset of the torsion webs 19 relative to the center of the pivot ring 16, the pivot axis 7 is displaced into the vicinity of the outer periphery of the helical pinion shaft 4, whereby the formation of reaction torques which are or would be produced as a result of the tooth arrangement forces resulting during the tooth arrangement engagement of the helical pinion 3 and gear wheel 2 in conjunction with the spacing of the effective line of these tooth arrangement forces from the pivot axis 7 can be reduced or prevented. In order to prevent the reaction torques in a manner as complete as possible, there is provision for the pivot axis 7 to be located inside the tangential plane which is formed in the contact location of the two part-circles or pitch circles of the gear wheel 2 and helical pinion 3.

Figure 2:
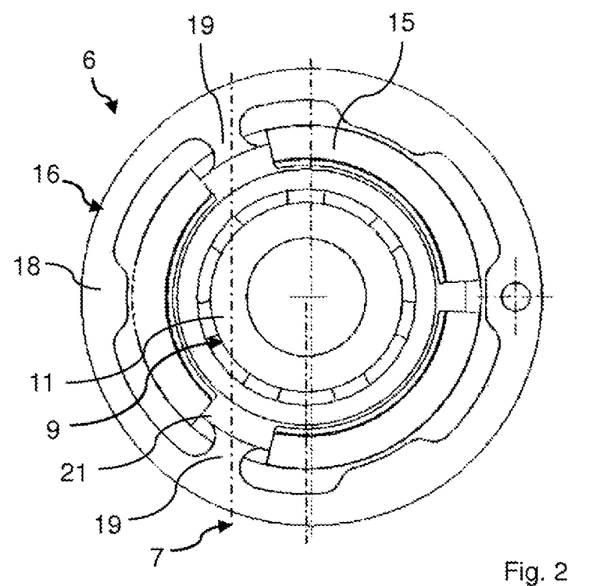
FIG. 2: is a view from the front of the fixed bearing of the steering gear according to FIG. 1.

The torsion webs 19 of the pivot ring 16 not only allow pivoting of the outer ring 18 relative to the inner ring 17 and therefore of the helical pinion shaft 4 relative to the gear wheel 2 or the housing 1, but instead at the same time bring about the resilient force by which the helical pinion 3 of the helical pinion shaft 4 is pressed into the tooth arrangement of the gear wheel 2 in order to achieve a gear backlash which is as small as possible and therefore a small production of noise during operation of the steering gear, in particular during so-called right/left steering. This resilient force results in that, during the assembly of the steering gear, the helical pinion shaft 4 is redirected as a result of contact with the gear wheel 2 to such an extent that sufficient torsion of the torsion webs 19 is produced, whereby the resilient restoring torques which result from the torsion of the torsion webs 19 act counter to this redirection of the helical pinion shaft 4 and consequently act thereon counter to the gear wheel 2.

The bearing device 14 of the floating bearing 8 also comprises a bearing sleeve 26 having a circular-ring-like cross-sectional surface area. The rotary bearing 10 of the floating bearing 8 is arranged within a longitudinal portion of the bearing sleeve 26, wherein the outer side of the outer bearing ring 12 of this rotary bearing 10 is in direct contact with the inner side of the bearing sleeve 26. In a second longitudinal portion of the bearing sleeve 26 and consequently with axial spacing from the rotary bearing 10, the bearing sleeve 26 has two coaxially orientated receiving openings 27 (with respect to the longitudinal axes 28 thereof), in which a guide element 29 is arranged in a fixed manner (for example, by a clamping connection). The guide element 29 has circular cross-sectional surface-areas over the entire longitudinal extent thereof, but with other cross-section forms, for example, angular ones, also being possible. The longitudinal axes 28 of the receiving openings 27 and therefore also the longitudinal axis 28 of the guide element 29 are orientated radially with respect to the longitudinal axis 25 of the bearing sleeve 26 and consequently intersect therewith, wherein at the same time a substantially perpendicular orientation is provided. At an end (which is the upper end in FIGS. 1 and 3) which is arranged outside the bearing sleeve 26, the guide element 29 forms a guide element head 30, the cross-sectional surface-area of which (which is constant over the longitudinal extent) is greater than the cross-sectional surface-area (which remains constant over the longitudinal extent) in the remaining portion of the guide element 29 which is referred to below as the guide element shaft 31. The guide element 29 is guided with an end portion which comprises the guide element head 30 inside a guide opening 33 which is formed by a retention element 32 of the floating bearing 8. The retention element 32 is integrated in a fixed or non-movable manner in the housing 1 of the steering gear and to this end connected directly to the housing 1 via screws 20. The longitudinal axis 28 of the guide opening 33 which has a circular opening cross-section and which consequently cylindrical is orientated coaxially relative to the longitudinal axis 28 of the guide element 29 with the steering gear being unloaded. Furthermore, the opening cross-section or the diameter of the guide opening is greater in a defined manner (if also to a relatively small extent) than the cross-sectional surface-area or the diameter of the guide element head 30, whereby inter alia an axial displaceability of the guide element 29 or of the guide element head 30 inside the guide opening 33 is provided. As a result of this displaceability, the floating bearing 8 in principle allows pivoting of the helical pinion shaft 4 about the pivot axis 7 which is formed by the fixed bearing 6 and which extends in a manner as precisely perpendicular as possible with respect to the longitudinal axis 28 of the guide element 29 of the floating bearing 8.

If the helical pinion shaft 4 is driven in rotation during operation of the steering gear in one of the two possible directions of rotation by means of the steering motor, this results, because of the tooth engagement forces, not only in forces which would produce pivoting of the helical pinion shaft 4 (upward in FIG. 1) with increasing resilient pretensioning of the torsion webs 19 of the fixed bearing 6 about the pivot axis 7 which is formed thereby but also in pivoting about a second axis 34 which is orientated perpendicularly thereto, wherein this pivotability is enabled as a result of play in particular in the fixed bearing 6 and as a result of a resilient deformation of the torsion webs 19. This pivot movement is transmitted from the helical pinion shaft 4 to the rotary bearing 10 and from it to the bearing sleeve 26 of the floating bearing 8 and results, even after very brief redirection in this regard, in contact of the guide element head 30 with the walls of the guide opening 33. As a result of the bearing sleeve 26 being supported eccentrically and only at one side by means of the guide element 29 which abuts the walls of the guide opening 33, a more extensive pivoting of the helical pinion shaft 4 about the second axis 34 then results in a slight rotation of the bearing sleeve 26 with the guide element 29 received therein, whereby the guide element head 30 tilts inside the guide opening 33. In this case, edges 35 of the guide element 29, which are formed, on the one hand, at the end of the guide element head 30 located in a distal manner with respect to the guide element shaft 31, and on the other hand, in the transition between the guide element head 30 and the guide element shaft 31, contact the walls of the guide opening 33 under high pressure.

Figure 3:
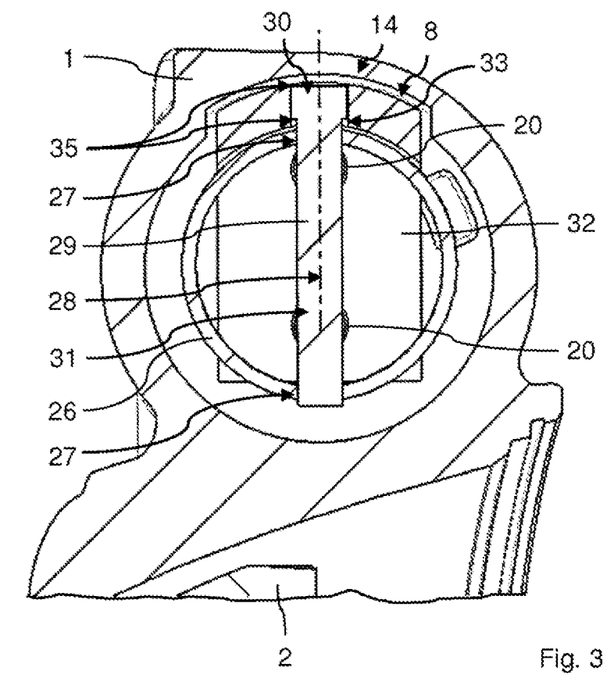
FIG. 3: is a partial cross-section through the steering gear along the plane of section in FIG. 1.

As soon as this tilting has been brought about, the floating bearing 8 prevents not only more extensive pivoting of the helical pinion shaft 4 about this second axis 34 but also about the pivot axis 7 so that an end stop is formed for the corresponding pivot movement of the helical pinion shaft 4. This end stop for pivoting of the helical pinion shaft 4 about the pivot axis 7 is consequently directly dependent on the extent to which a pivoting of the helical pinion shaft 4 about the second axis 34 located perpendicularly relative to the pivot axis 7 is possible before the guide element head 30 tilts inside the guide opening 33. Since this pivotability of the helical pinion shaft 4 is substantially independent of the wear state of the steering gear and where applicable also the settling state of the helical pinion 3 and the gear wheel 2, a limitation for pivoting of the helical pinion shaft 4 about the pivot axis 7 is produced as a result of the configuration of the floating bearing 8 according to the disclosure, which limitation is also independent of this wear state and where applicable also settling state and is in particular directly effective in the case of loading of the helical pinion shaft 4 by means of a torque, that is to say, during operation of the steering gear, if the helical pinion shaft 4 is loaded by means of a torque or becomes effective before the forces which are produced by the loading of the helical pinion shaft 4 overcompensate for the opposing forces which are produced from the resilient loading by means of the fixed bearing 6 so that pivoting of the helical pinion shaft 4 which is thereby caused about the pivot axis 7 during operation of the steering gear is prevented by the floating bearing 8.

Consequently, the floating bearing 6 according to the disclosure brings about in principle and during the entire period of use of the steering gear a pivotability of the helical pinion shaft 4 about the pivot axis 7 which is prevented to the greatest possible extent or completely if the helical pinion shaft 4 is loaded with a torque during operation of the steering gear so that a minimal basic play or a freedom from play to the greatest possible extent is produced in this regard. In turn, this also allows with a relatively weak pretensioning (torsion) of the torsion rod 19 of the fixed bearing 6 an adequate resilient loading of the helical pinion shaft 4 counter to the gear wheel 2 to be ensured, whereby an undesirable noise behavior, in particular in the case of right/left steering, can be prevented. At the same time, temperature-related expansions and geometry changes as a result of water absorption in the case of elements comprising plastics material can always be compensated for when the helical pinion shaft 4 is not loaded currently with a torque (that is to say, when the steering system of the motor vehicle does not carry out any steering movement) because a pivotability of the helical pinion shaft 4 about the pivot axis 7 is then enabled by the floating bearing 8 according to the disclosure. An undesirably high friction in particular in the tooth arrangement between the helical pinion 3 and the gear wheel 2 can thereby be prevented.

Figure 4:
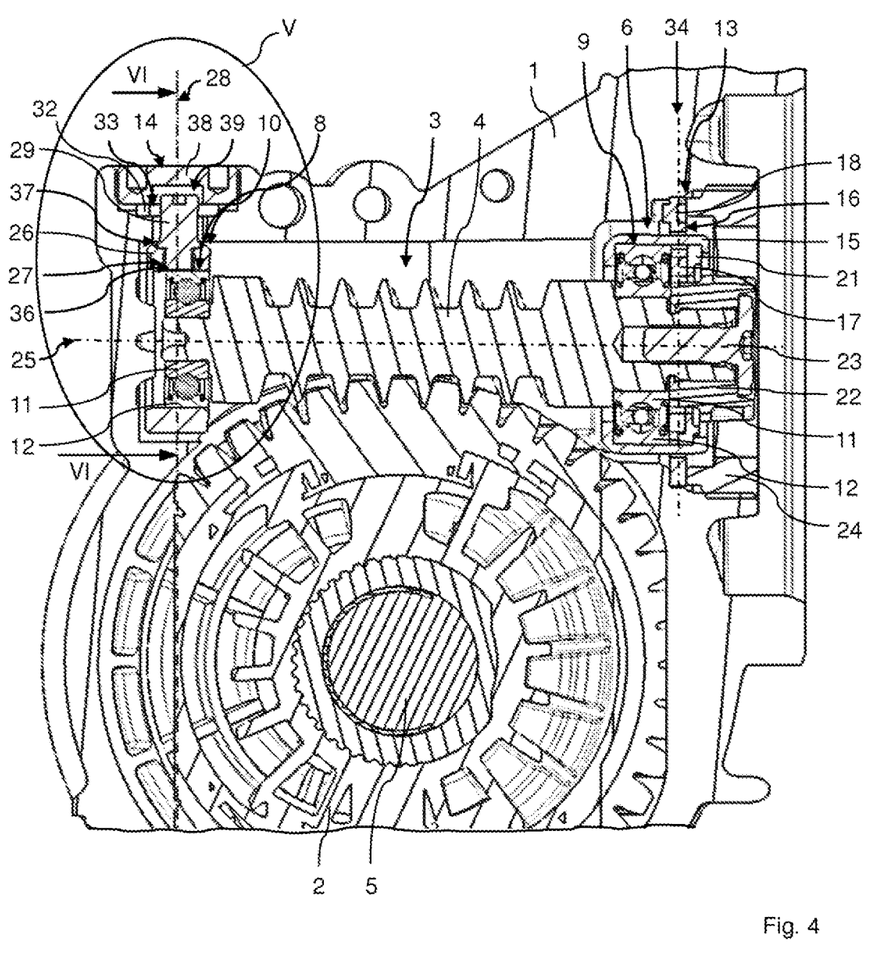
FIG. 4: is a longitudinal section through a steering gear according to the disclosure according to a second embodiment.
Figure 5:
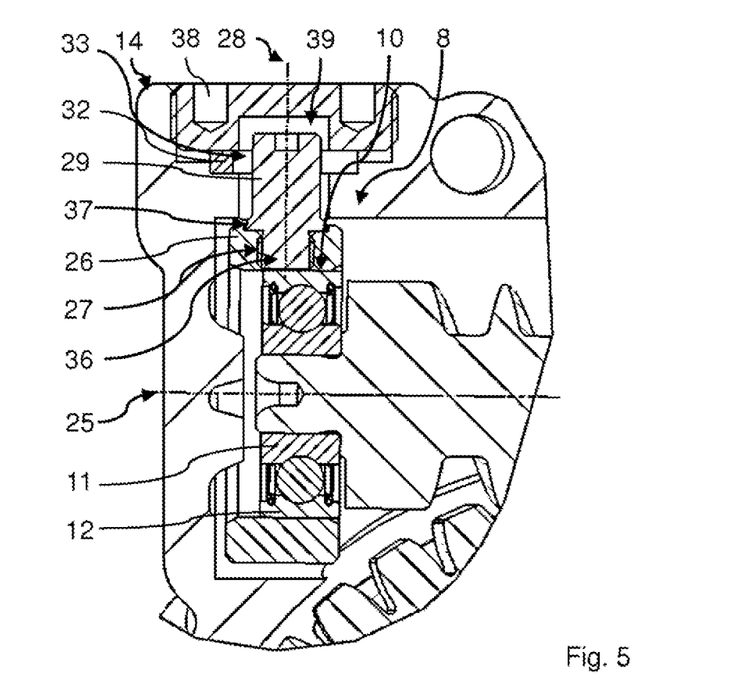
FIG. 5: is an enlarged view of the cutout indicated V in FIG. 4.
Figure 6:
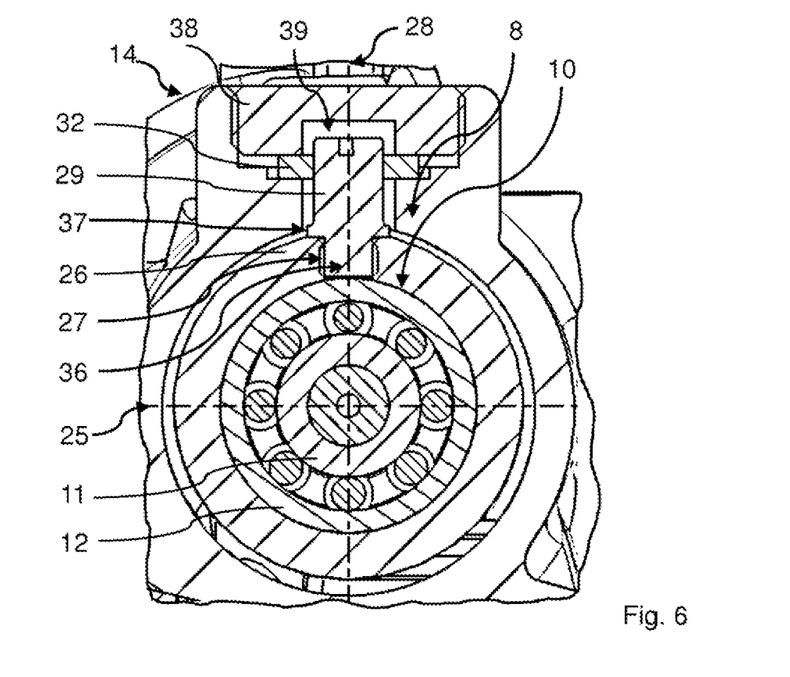
FIG. 6: is a partial cross-section through the steering gear along the plane of section VI-VI in FIG. 4.

FIGS. 4 to 6 show an alternative embodiment of a steering gear according to the disclosure, wherein it differs from the steering gear according to FIGS. 1 to 3 substantially only with regard to the configuration of the floating bearing 8 (according to the disclosure).

In the floating bearing 8 of the steering gear according to FIGS. 4 to 6, the guide element 29 comprises a fixing portion 36, with which it is received in a receiving opening 27 of the bearing sleeve 26 and is fixed therein, for example, in a materially engaging manner (for example, soldered), in a non-positive-locking manner (for example, by a press-fit) or in a positive-locking manner (for example, by means of a screw connection). In this case, the receiving opening 27 and therefore also the guide element 29 are located in a (longitudinally axial) portion of the bearing sleeve 26 in which the outer bearing ring 12 of the rotary bearing is also arranged. The guide element 29 further does not form a guide element head 30 which is increased with regard to the cross-sectional dimensions; instead, the guide element 29 has constant cross-sectional dimensions starting from a peripheral stop 37, by which the insertion depth of the guide element 29 in the receiving opening 27 of the bearing sleeve 26 is limited, as far as the free end of the guide element 29.

The retention element 32 in the steering gear according to FIGS. 4 to 6 is in the form of a U-shaped plate and consequently forms a guide opening 33 which is open toward one side, wherein the longitudinal direction of the guide opening 33 extends in the direction of the longitudinal axis 25 of the bearing sleeve 26 or the helical pinion shaft 4 (starting from the opening base as far as the open side). With respect to the transverse direction, the guide opening 33 has only a slight over-dimension with regard to the width of the guide element 29 which is, for example, square in cross-section, in order to substantially directly limit, according to the operation, as already described for the floating bearing of the steering gear according to FIGS. 1 to 3, a pivotability of the helical pinion shaft 4 about the pivot axis 7 of the fixed bearing 6 as a result of a tilting of the guide element 29 inside the guide opening 33 as soon as the helical pinion shaft 4 is loaded during operation of the steering gear with a torque. With respect to the longitudinal direction of the guide opening 33, however, it has substantially greater dimensions than the guide element 29, whereby the pivotability of the helical pinion shaft 4 about the pivot axis 7 (which is possible in the unloaded state of the helical pinion shaft 4) is guided by the retention element 32 and furthermore movements of the helical pinion shaft 4 and the associated components of the floating bearing 8 in the direction of the longitudinal axis 25 of the helical pinion shaft 4 are possible as a result of a loading of the helical pinion shaft 4.

The retention element 32 is connected in a non-movable manner to a retention element holder 38 which is again integrated in the housing 1 of the steering gear in a fixed manner. In a portion adjacent to the guide opening of the retention element 32, the retention element holder 38 forms a receiving recess 39, in which an end portion of the guide element 29 extends, wherein the receiving recess 39 has such large dimensions that a movability of the guide element 29 provided for the steering gear relative to the retention element 32 is not impeded by contact of the guide element 29 with the retention element holder 38.

Figure 7:
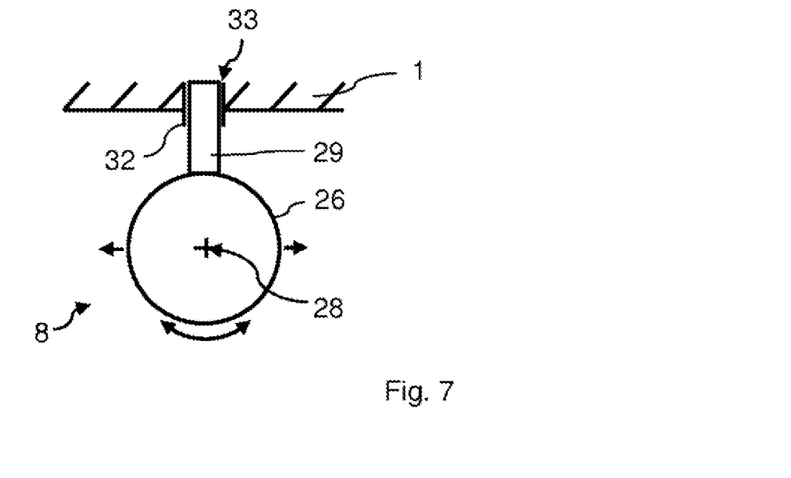
FIG. 7: is a schematic illustration of the functional principle of a floating bearing of a steering gear according to FIGS. 1 to 6.
Figure 8:
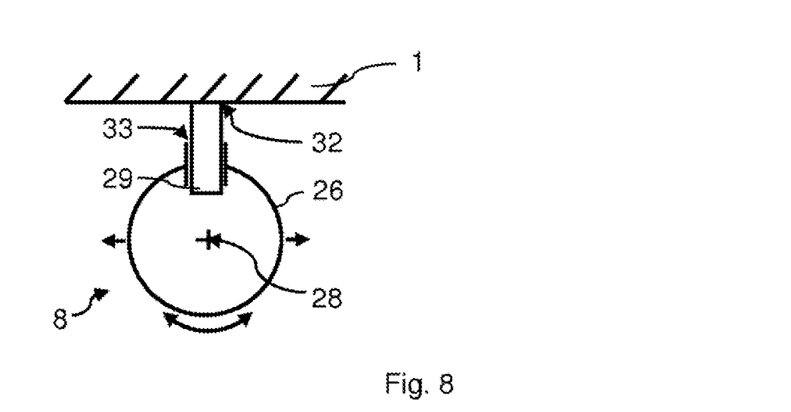
FIG. 8: is a schematic illustration of the functional principle of a floating bearing according to the disclosure according to an alternative embodiment.
Figure 9:
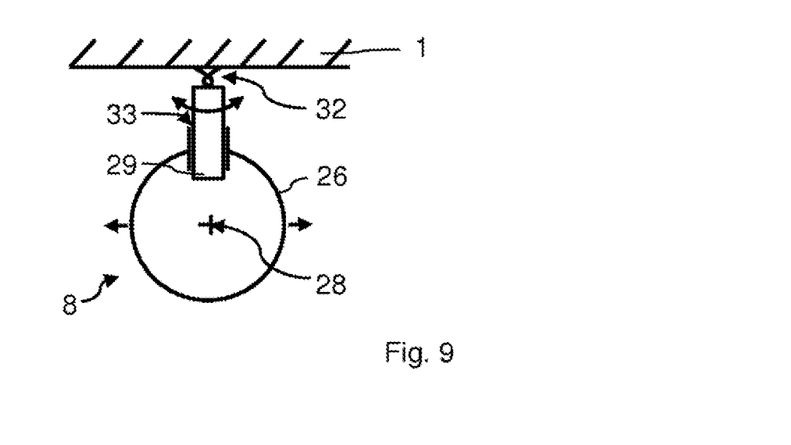
FIG. 9: is a schematic illustration of the functional principle of a floating bearing according to the disclosure according to another alternative embodiment.

FIGS. 7 to 9 show as simplified illustrations functional principles of three alternative embodiments of floating bearings 8 according to the disclosure.

In this case, the floating bearing 8 according to FIG. 7 substantially corresponds structurally and functionally to the floating bearings 8 of the steering gear according to FIGS. 1 to 6. Consequently, a guide element 29 is displaceable guided in a guide opening 33 which is formed by a retention element 32 which is integrated in a housing 1 of a steering gear which is not further illustrated and is connected in a non-movable manner to a bearing sleeve 26 of the floating bearing 8. Tilting of the guide element 29 inside the guide opening 33 is carried out in the event of loading of a helical pinion shaft 4 which is received in the bearing sleeve 26 (not illustrated in FIGS. 7 to 9) as a result of a transverse movement of the bearing sleeve 26, which also results in a slight rotational movement of the bearing sleeve 26 and therefore in a tilting or tipping of the guide element 29 inside the guide opening 33, as a result of the decentralized bearing of the guide element 29 inside the guide opening 33 with respect to the longitudinal axis 28 of the bearing sleeve 26. In the floating bearing 8 according to FIG. 8, this operation is identical to the greatest possible extent, wherein in this embodiment the guide element 29 is connected in a non-movable manner to the retention element 32 which is integrated in the housing 1 and is movably supported in a decentralized manner with respect to the longitudinal axis 28 in a guide opening 33 which is formed by the bearing sleeve 26.

A corresponding movable bearing of the guide element 29 in a guide opening 33 which is formed by the bearing sleeve 26 is also provided in the floating bearing 8 according to FIG. 9. In this embodiment, however, the guide element 29 is connected to the retention element 32 which is integrated in the housing 1 so as to be pivotable about an axis which is located substantially parallel with the longitudinal axis 28 of the bearing sleeve 26. In order, in such an embodiment of a floating bearing according to the disclosure, to obtain tilting of the guide element 29 inside the guide opening 33 of the bearing sleeve 26 as a result of a transverse movement of the bearing sleeve 26 which results in a pivoting movement of the guide element 29, the bearing sleeve 26 must be prevented from rotating about the longitudinal axis 28 as a result of a torque produced by the pivoting of the guide element 29 by suitable means, for example, by a rotationally secure connection of the bearing sleeve 26 of the floating bearing 8 to a bearing sleeve 15 of a fixed bearing 6 of the steering gear.

LIST OF REFERENCE NUMERALS

1 Housing
2 Gear wheel/helical wheel/worm wheel
3 Helical pinion/screw
4 Helical pinion shaft
5 Output shaft
6 Fixed bearing
7 Pivot axis
8 Floating bearing
9 Rotary bearing of the fixed bearing
10 Rotary bearing of the floating bearing
11 Inner bearing ring of a rotary bearing
12 Outer bearing ring of a rotary bearing
13 Bearing device of the fixed bearing
14 Bearing device of the floating bearing
15 Bearing sleeve of the fixed bearing
16 Pivot ring
17 Inner ring of the pivot ring
18 Outer ring of the pivot ring
19 Torsion web
20 Screw
21 Support disk
22 Coupling piece
23 Screw
24 Helical ring
25 Longitudinal axis of the helical pinion shaft/bearing sleeves
26 Bearing sleeve of the floating bearing
27 Receiving opening of the bearing sleeve of the floating bearing
28 Longitudinal axis of the receiving openings of the bearing sleeve of the floating bearing/the guide element/the guide opening
29 Guide element
30 Guide element head
31 Guide element shaft
32 Retention element
33 Guide opening
34 Second axis
35 Edge of the guide element
36 Fixing portion of the guide element
37 Stop of the guide element
38 Retention element holder
39 Receiving recess of the retention element holder

The invention claimed is:

1. A floating bearing for a steering gear, comprising:
a rotary bearing comprising:
an inner bearing ring configured to receive a helical pinion shaft of the steering gear; and
an outer bearing ring integrated in a bearing sleeve,
wherein the bearing sleeve cooperates with a guide element and the guide element cooperates with a retention element that is configured for fixed integration in a housing of the steering gear in such a manner that the bearing sleeve is movable relative to the retention element in a first direction, which is oriented radially with respect to the longitudinal axis of the bearing sleeve, when the helical pinion shaft is not loaded with a torque, and the bearing sleeve is not movable relative to the retention element in the first direction if the helical pinion shaft is loaded with a torque by the bearing sleeve being moved relative to the retention element in a second direction, which is oriented radially with respect to the longitudinal axis and perpendicularly to the first direction, whereby the guide element tilts in a guide opening of the retention element or the bearing sleeve.

2. The floating bearing as claimed in claim 1, wherein:
the bearing sleeve is connected to the guide element, and a portion of the guide element spaced apart from the longitudinal axis of the bearing sleeve is guided in an axially movable manner in a guide opening of the retention element, which extends in a radial direction with respect to the longitudinal axis of the bearing sleeve, or
the guide element is connected to the retention element, and at least one portion of the guide element spaced apart from the longitudinal axis of the bearing sleeve is guided in an axially movable manner in at least one guide opening of the bearing sleeve, which extends in a radial direction with respect to the longitudinal axis of the bearing sleeve.

3. The floating bearing as claimed in claim 1, wherein the guide element is pivotably connected to the retention element and the bearing sleeve is secured to prevent rotation about the longitudinal axis.

4. The floating bearing as claimed in claim 1, wherein the guide element extends in a portion of the bearing sleeve that is spaced apart axially from the outer bearing ring of the rotary bearing through one or more receiving openings of the bearing sleeve.

5. The floating bearing as claimed in claim 1, wherein the guide element is connected to the bearing sleeve in a portion of the bearing sleeve which also integrates the outer bearing ring of the rotary bearing.

6. The floating bearing as claimed in claim 1, wherein the guide element is connected to the bearing sleeve as a separate component in at least one of a positive-locking manner, a non-positive-locking manner, and a materially engaging manner.

7. A steering gear for a steering system of a motor vehicle comprising:
a gear wheel;
a helical pinion shaft comprising a helical pinion that meshes with the gear wheel;
a floating bearing that supports the helical pinion shaft on a first side of the helical pinion, the floating bearing comprising:
a rotary bearing including:
an inner bearing ring configured to receive the helical pinion shaft of the steering gear; and
an outer bearing ring integrated in a bearing sleeve,
wherein the bearing sleeve cooperates with a guide element and the guide element cooperates with a retention element in such a manner that the bearing sleeve is movable relative to the retention element in a first direction, which is oriented radially with respect to the longitudinal axis of the bearing sleeve, when the helical pinion shaft is not loaded with a torque, and the bearing sleeve is not movable relative to the retention element in the first direction if the helical pinion shaft is loaded with a torque by the bearing sleeve being moved relative to the retention element in a second direction, which is oriented radially with respect to the longitudinal axis and perpendicularly to the first direction, whereby the guide element tilts in a guide opening of the retention element or the bearing sleeve; and a housing in which the retention element of the floating bearing is integrated in a fixed manner.

8. The steering gear as claimed in claim 7, wherein:

the helical pinion shaft is supported at second side of the helical pinion in a fixed bearing, which defines a pivot axis about which the helical pinion shaft is pivotable, and a longitudinal axis of the guide opening of the floating bearing is oriented transversely to the pivot axis.

9. The steering gear as claimed in claim 7, wherein the retention element is connected directly to the housing or is formed by the housing.

10. A steering system comprising:

a steering gear comprising:
- a gear wheel;
- a helical pinion shaft comprising a helical pinion that meshes with the gear wheel;
- a floating bearing that supports the helical pinion shaft on a first side of the helical pinion, the floating bearing comprising:
    - a rotary bearing including:
        - an inner bearing ring configured to receive the helical pinion shaft of the steering gear; and
        - an outer bearing ring integrated in a bearing sleeve,
    - wherein the bearing sleeve cooperates with a guide element and the guide element cooperates with a retention element in such a manner that the bearing sleeve is movable relative to the retention element in a first direction, which is oriented radially with respect to the longitudinal axis of the bearing sleeve, when the helical pinion shaft is not loaded with a torque, and the bearing sleeve is not movable relative to the retention element in the first direction if the helical pinion shaft is loaded with a torque by the bearing sleeve being moved relative to the retention element in a second direction, which is oriented radially with respect to the longitudinal axis and perpendicularly to the first direction, whereby the guide element tilts in a guide opening of the retention element or the bearing sleeve; and
    - a housing in which the retention element of the floating bearing is integrated in a fixed manner; and a steering motor which is connected to the helical pinion shaft of the steering gear in a rotationally driving manner.

11. The floating bearing as claimed in claim 1, wherein the bearing sleeve is connected to the guide element, and a portion of the guide element spaced apart from the longitudinal axis of the bearing sleeve is guided in an axially movable manner in a guide opening of the retention element, the guide opening extending in a radial direction with respect to the longitudinal axis of the bearing sleeve.

12. The floating bearing as claimed in claim 1, wherein the guide element is connected to the retention element, and at least one portion of the guide element spaced apart from the longitudinal axis of the bearing sleeve is guided in an axially movable manner in at least one guide opening of the bearing sleeve, the at least one guide opening extending in a radial direction with respect to the longitudinal axis of the bearing sleeve.

13. The steering gear as claimed as claimed in claim 8, wherein the longitudinal axis of the guide opening of the floating bearing is oriented perpendicularly to the pivot axis.

* * * * *